United States Patent [19]
Zhang et al.

[11] Patent Number: 5,936,675
[45] Date of Patent: Aug. 10, 1999

[54] METHOD AND ARCHITECTURE FOR REDUCING FLICKERS USING ONE FIFO VIDEO LINE BUFFER IN VIDEO SIGNAL CONVERSIONS

[75] Inventors: Sunny Y. Zhang, Palo Alto; Jack Jan-Kwe Li, Saratoga, both of Calif.

[73] Assignee: AI Tech International Corp., Fremont, Calif.

[21] Appl. No.: 09/067,971

[22] Filed: Apr. 28, 1998

[51] Int. Cl.[6] .............................. H04N 7/01; H04N 5/21
[52] U.S. Cl. ..................... 348/446; 348/447; 348/607; 348/910
[58] Field of Search .................... 348/446, 447, 348/607, 910

[56] References Cited

U.S. PATENT DOCUMENTS

| | | | |
|---|---|---|---|
| 5,812,203 | 9/1998 | Swan | 348/446 |
| 5,815,208 | 9/1998 | Samela et al. | 348/446 |
| 5,822,008 | 10/1998 | Inoue et al. | 348/446 |
| 5,892,551 | 4/1999 | Uematsu | 348/447 |
| 5,894,329 | 4/1999 | Takeda et al. | 348/446 |
| 5,894,330 | 4/1999 | Huang et al. | 348/447 |
| 5,896,178 | 4/1999 | Inoue | 348/453 |

*Primary Examiner*—Andrew I. Faile
*Assistant Examiner*—Mark W. Hrozenchik
*Attorney, Agent, or Firm*—Joe Zheng; Silicon Valley Patent Group.

[57] ABSTRACT

A system for reducing flickers in converting non-interlaced video signals to interlaced video signals is disclosed. The non-interlaced video signals are first modified by two independent adjustable parameters, each having a different weight on the received signals. A FIFO line buffer is used to delay respectively and alternatively the two modified signals to generate a portion of output signals. The final output interlaced signals are generated by combining the delayed signal from the FIFO line buffer with one of the two modified signals. As a result and for the first time, only one FIFO line buffer is used in such system for producing a converted interlaced signal with minimum visual errors in video signal conversions.

14 Claims, 5 Drawing Sheets

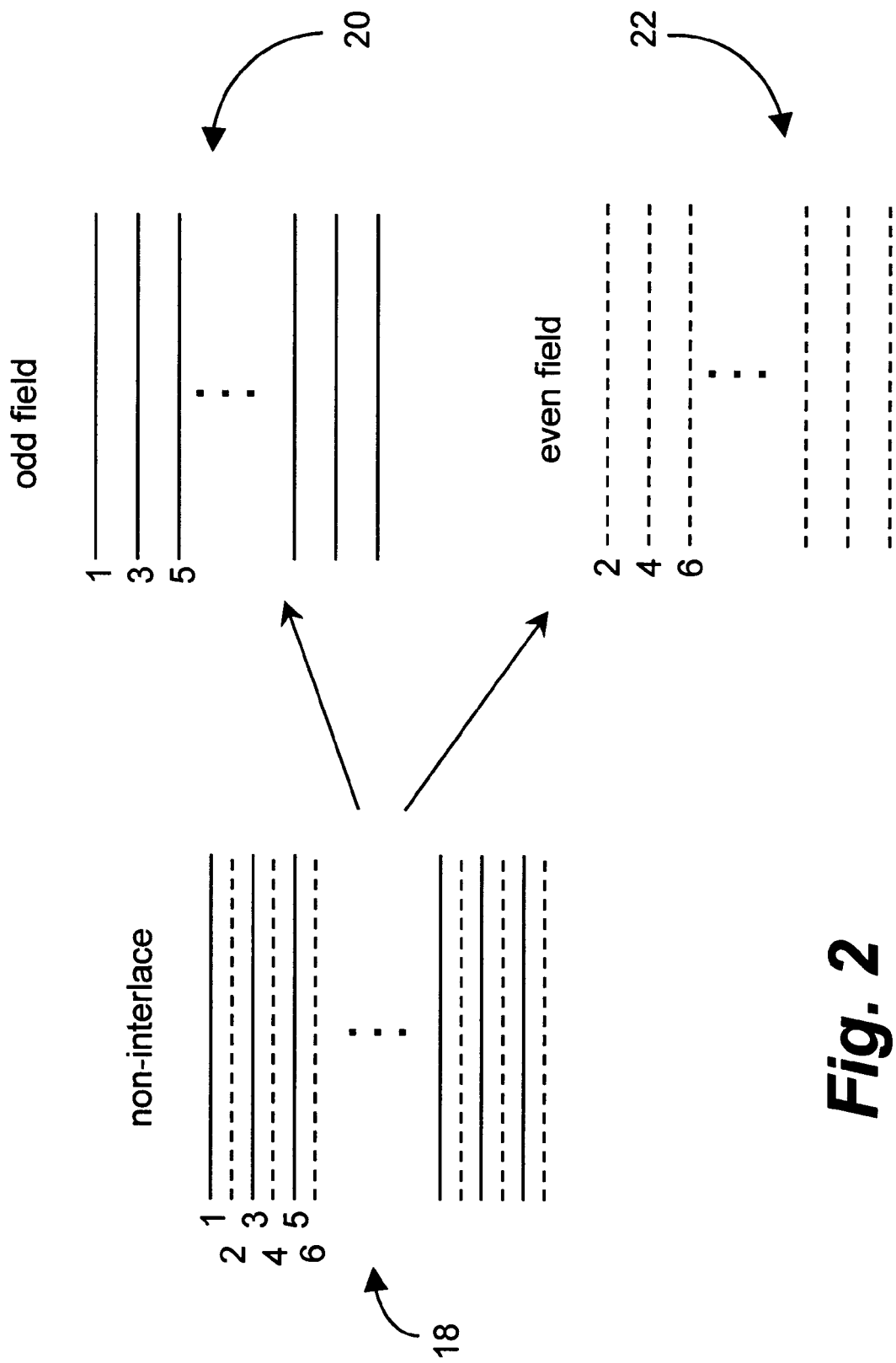

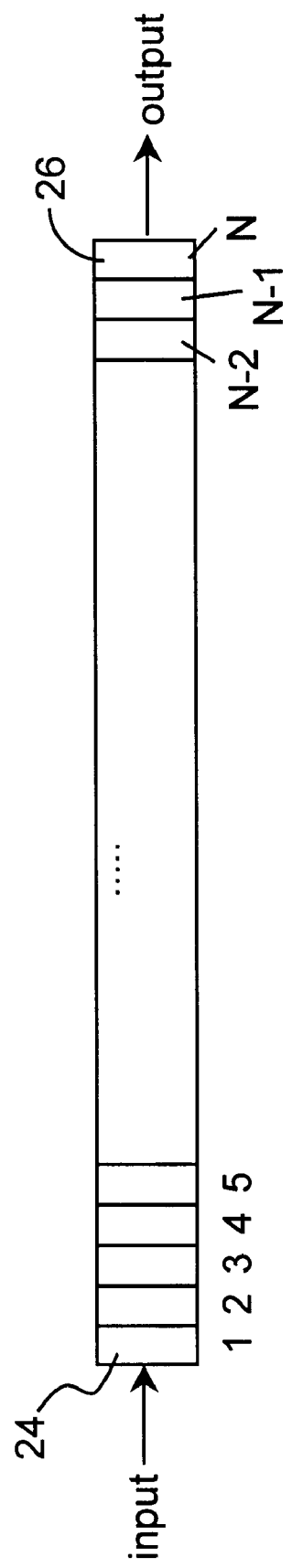

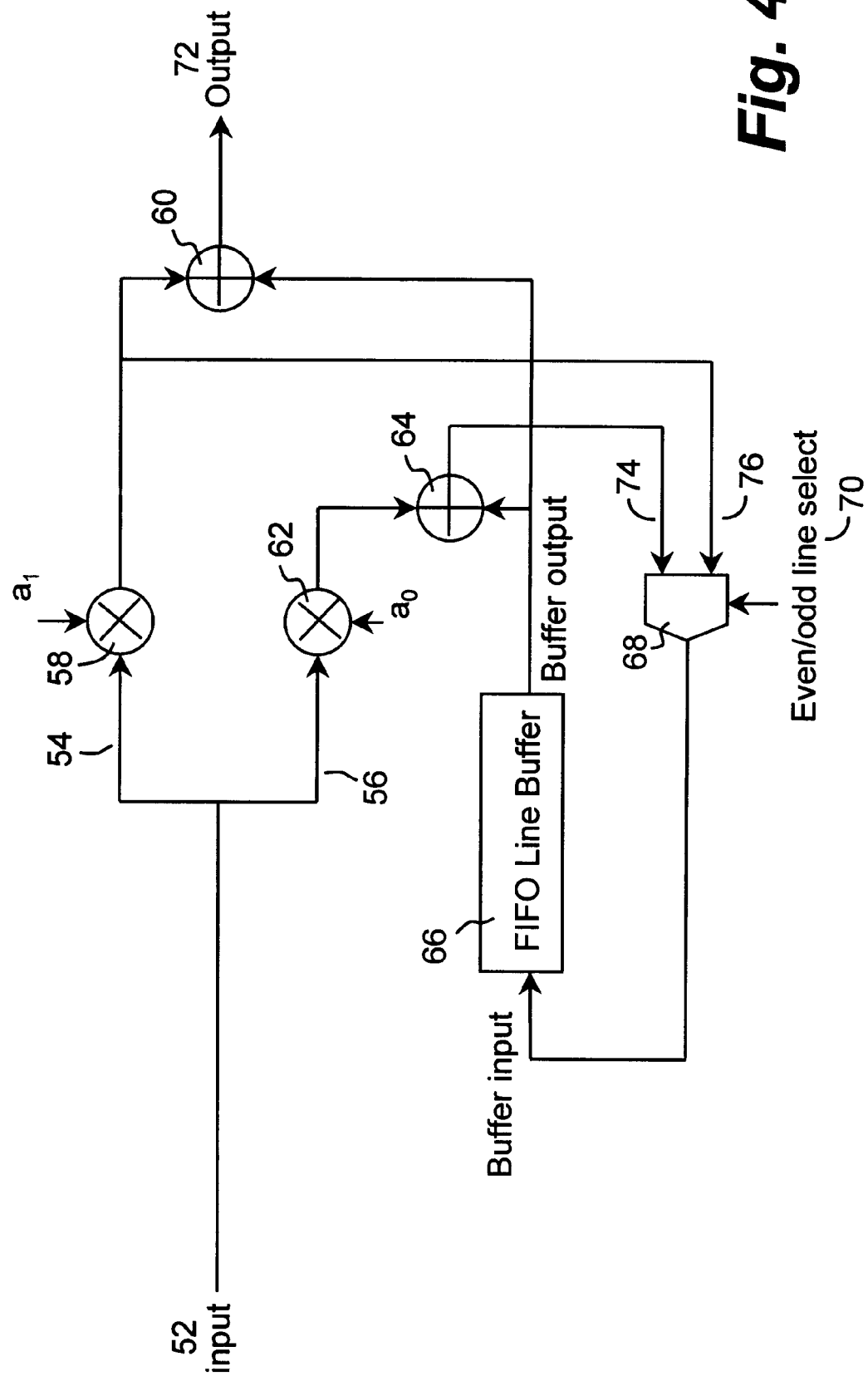

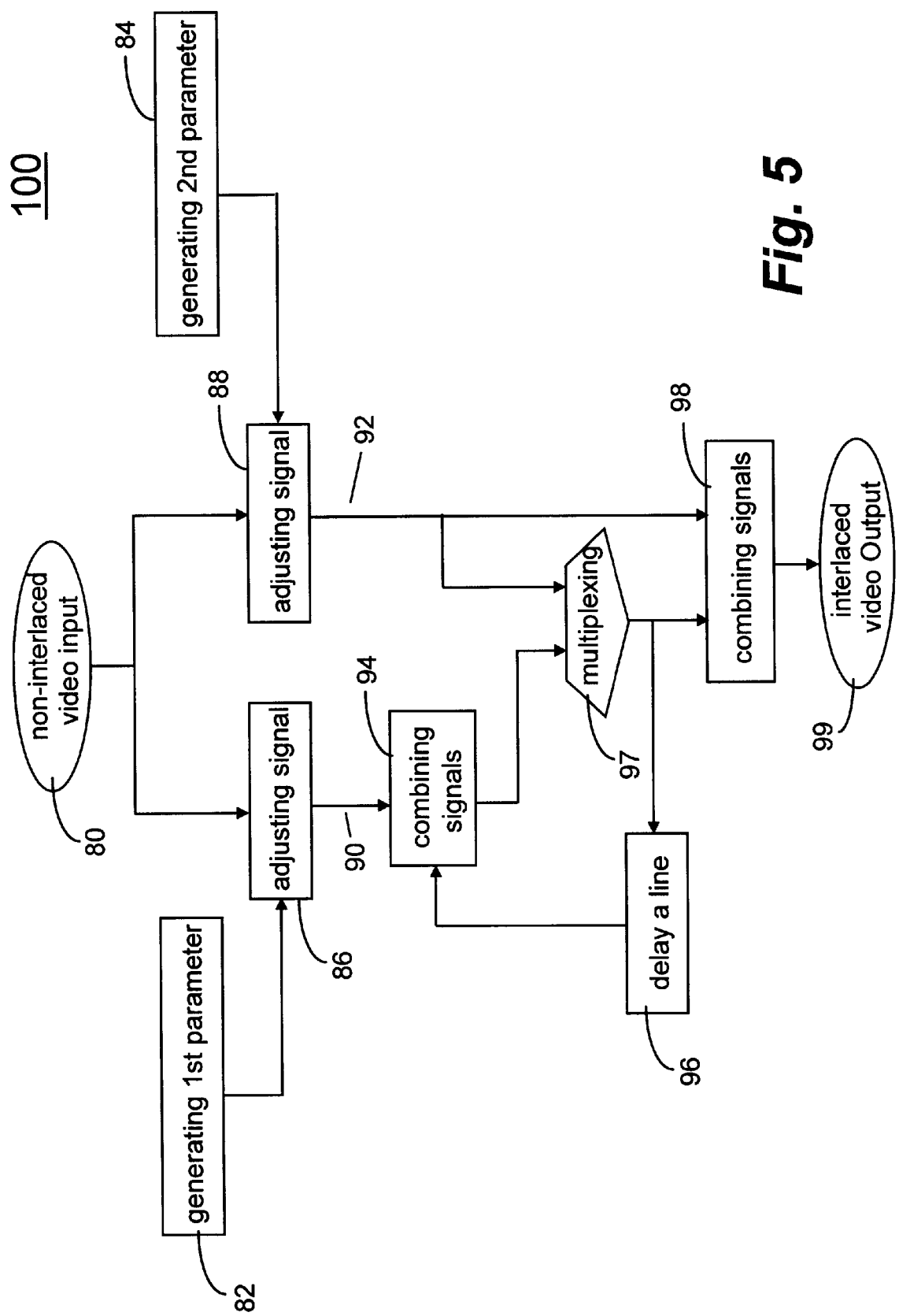

METHOD AND ARCHITECTURE FOR REDUCING FLICKERS USING ONE FIFO VIDEO LINE BUFFER IN VIDEO SIGNAL CONVERSIONS

FIELD OF INVENTION

The present invention relates to video signal conversions and more particularly to improved methods and architectures for reducing flickers in converting digitally from non-interlaced video signals to interlaced video signals.

DESCRIPTION OF THE RELATED ART

There are many applications that desire to display computer video signals from computers onto a larger, more advantageous and more pleasant regular television screen, for example, on-line presentation, computer simulations or games, and web browsing. However nearly all computers in use today output a standard non-interlaced digital video format, such as 640 by 480 SuperVGA, applicable to all computer monitors while many television (TV) sets in use today expect to receive analog interlace video format, such as NTSC system in North America and Japan and PAL system in many Asian and European countries. A signal conversion from the standard non-interlaced digital video format to the analog interlace video format must be carried out before computer image signals can be displayed on a regular TV screen.

The non-interlaced format tends to scan a screen progressively, namely one line after another, to form a complete image frame while the interlace format completes an image frame by scanning even lines first followed by scanning odd lines. The major difference is that a computer image frame is formed with one scanning or a field while a TV image frame is formed with two scanning or two fields. To convert non-interlaced digital signals to interlace analog TV signals, a conventional implementation is to employ a multiplexer to alternatively extract even and odd lines from the computer signals followed by a digital-to-analog (D/A) conversion.

The above signal separation method works generally well for scene images. However, line Intensity alternating or swings, known as flickers, occur when there are high contrast contents in computer-based images. For example, a series of alternating black and white horizontal lines are generated as a computer image that can be satisfactorily displayed on a non-interlaced computer monitor but would be annoyingly displayed on a TV screen as one field comprising all the white lines shows for one thirtieth of a second and alternatively another field comprising all the black lines shows for another one thirtieth of a second, such images appearing like elastic lines swinging up and down on a TV screen. Such flickers occur generally around horizontal parts of all letters and sharp contrast objects in images when displayed on regular TV screens.

There have been many efforts in the art to reduce the flickers when computer video signals are converted to regular TV signals. Both analog and digital methods have been designed and many are based on the principle of smoothing the line intensities with two or more adjacent lines to reduce the flickers. Such reduction of the flickers is in fact at the expense of sharp images. The resultant images when displayed on a TV screen appears softening, sharp edges becoming blurred edges and black and white lines becoming gray lines. The smoothing process is equivalent to spreading a high contrast signal to its neighbors, resulting in smearing effects. There is, therefore, a great need for a method and apparatus for converting computer signals to TV signals for display on regular TV screens with minimum smearing effects. Further to minimize the cost of manufacturing the devices that convert non-interlaced signals to interlaced signal, the flicker reduction process is preferably embedded in application specified integrated circuits (ASIC) in which an efficient memory use is desired. While many existing flicker reduction methods rely on a number of lines to determine a flicker-minimized output, the same number of line buffers are often employed to store the line signals. There is therefore another need for a flicker reduction process that minimizes the memory use while achieving the same flicker reduction results, so as to reduce the cost of designing and manufacturing such ASICs and the subsequent devices.

SUMMARY OF THE INVENTION

The present invention has been made in consideration of the above described problems. In one preferred embodiment, the present invention is a system for reducing flickers using one FIFO video line buffer in video signal conversions. According to the principles of the present invention, the method for reducing flickers in transforming non-interlaced video signals to interlaced video signals, each of the video signals comprising a plurality of lines of signals, each of the line signal comprising pixels, the method comprising the steps of:

receiving the non-interlaced video signals;

outputting the pixels in the non-interlaced video signals successively and line by line;

receiving a first adjustable parameter and a second adjustable parameter;

obtaining a first modified signal resulting from the non-interlaced video signals being modified by the first adjustable parameter;

obtaining a second modified signal resulting from the non-interlaced video signals being modified by the second adjustable parameter;

receiving a multiplexed signal from a multiplexer having a first input and a second input, wherein the first input and the second input receive a combined signal and the second modified signal, respectively and wherein the multiplexed signal is selected alternatively from the first input and the second input;

delaying the multiplexed signal;

generating the combined signal by combining the delayed multiplexed signal with the first modified signal;

outputting the combined signal as the interlaced video signals.

Further, the architecture for reducing flickers in transforming non-interlaced video signals to interlaced video signals, each of the video signals comprising a plurality of lines of signals, each of the line signal comprising pixels, the architecture comprising:

a first multiplier, receiving the non-interlaced video signals, for multiplying the received non-interlaced video signals with a first adjustable parameter;

a second multiplier, receiving the non-interlaced video signals, for multiplying the received non-interlaced video signals with a second adjustable parameter;

means for delaying a multiplexed signal;

a first adder in connection, respectively, with the first multiplier and the delaying means, for combining a first multiplied result from the first multiplier with the delayed multiplexed signal from the delaying means;

a multiplexer having a first input and a second input, the first input receiving an added result from the first adder and the second input receiving a second multiplied result from the second multiplier; and a second adder, in connection, respectively, with the delaying means and second multiplier, for combining the delayed multiplexed signal from the delaying means with the second multiplied result from the second multiplier.

Accordingly, an important object of the present invention is to provide a generic system for effectively minimizing flickers in converting non-interlaced video signal to interlaced video signals; and Other objects, together with the forgoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 2 shows a graphical representation of a non-interlaced video signal comprising one field being converted to a interlaced video signal comprising two fields;

FIG. 3 demonstrates an operational representation of a FIFO line buffer used in the disclosed system;

FIG. 4 shows one architecture of the disclosed system;

FIG. 5 illustrates the operational flow diagram of the disclosed system according to a preferred embodiment thereof.

DETAILED DESCRIPTION OF THE INVENTION

Notation and Nomenclature

Figure 1:
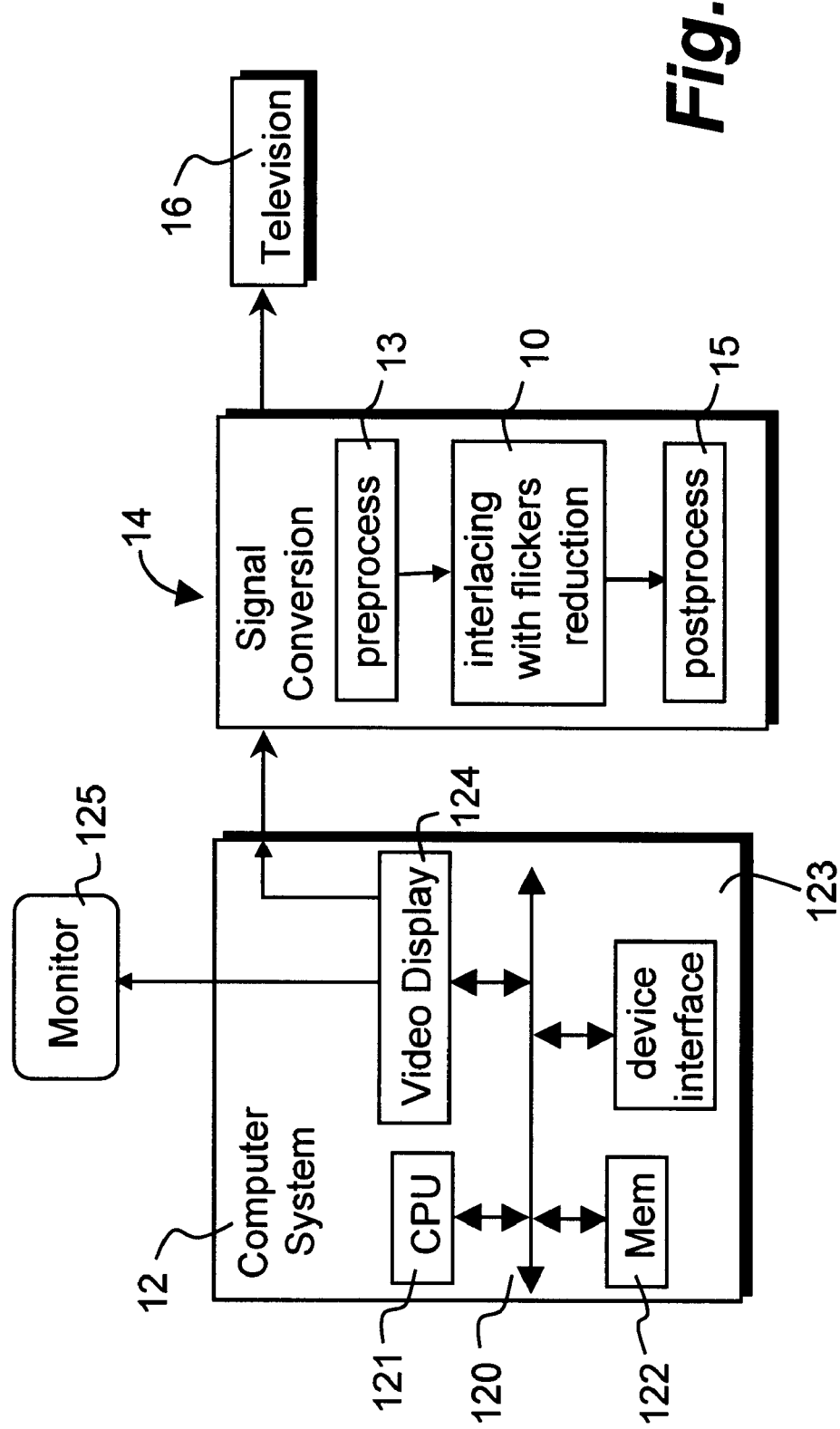
FIG. 1 depicts a configuration of the disclosed system in communication with a computer and a television.

In the following detailed description of the present invention, numerous specific details are set forth in order to provide a through understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

The detailed description of the present invention in the following are presented largely in terms of procedures, steps, logic blocks, processing, and other symbolic representations that resemble the operations of image data processing devices. These process descriptions and representations are the means used by those experienced or skilled in the art to most effectively convey the substance of their work to others skilled in the art. The present invention is a method and architecture for reducing flickers in video signal conversions. The method along with the architecture to be described in detail below is a self-consistent sequence of steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the computing device's registers and memories into other data similarly represented as physical quantities within the computing device or other electronic devices.

Preferred Embodiment—Description

The present invention discloses a system, including a method and an architecture, for reducing flickers using one first-in-first-out (FIFO) video buffer in converting non-interlaced video signals to interlaced video signals. Referring now to the drawings, in which like numerals refer to like parts throughout the several views. FIG. 1 is shown a configuration in which the disclosed system 10 may be practiced. Referenced by 12 is a computing device, or computer, comprising a CPU 121, memories 122, device interface 123, and a video display interface 124, all in communication with a computer bus 120. To display results performed by the computer 12, a monitor 125 is generally provided and communicates with the video display interface 124 which generates non-interfaced video signals for the monitor 125 to display thereon, the generated non-interfaced video signals are generally conformed to the standard promulgated by Video Electronics Standards Association (VESA). There are many kinds of video interfaces that can generate the VESA compatible video signals, such as Stealth64 Graphics Accelerator 2001 Series by Diamond Multimedia Systems, Inc. located at 2880 Junction Avenue in San Jose, Calif. 95134. It should be noted that neither the computer system 12 nor the video interface 124 is a necessary part of the disclosed system 10. The computer system 12 and the video interface 124 are used in this particular configuration to show how the non-interlaced video signals are obtained. Referenced by 14 is a signal converting device that converts the non-interlaced video signals to interlaced video signals applicable to regular TV sets. The signal converting device 14 comprises a preprocess 13, an interlacing process 10 and a postprocess 15. The preprocess 13, receiving the non-interlaced video signals generally in analog form, comprises analog-to-digital (A/D) conversion, color conversion and decimation processes and the postprocess, generating the interlaced TV-compatible video signals in analog form, comprises signal scaling circuitry, encoder process and digital-to-analog (D/A) conversion. The actual signal interlacing occurs in the interlacing process 10 that further performs the flicker reduction therein. A regular television 16 in communication with the signal converting device 14 receives the converted interlaced video signals, namely from the postprocess 15, to display them thereon.

It should be noted that FIG. 1 is an exemplary configuration in which the disclosed invention may be practiced. It is understood to those skilled in the art that the disclosed system may be embedded inside a computer or a TV and further the disclosed system may be implemented in an ASIC chip. FIG. 1 should not be considered as a limited configuration in which the disclosed system can be practiced.

Referring to FIG. 2, there shows a graphical representation of a non-interlaced video signal and the corresponding interlaced signals that the disclosed system receives and outputs, respectively. As referenced by 18, the non-interlaced video signal comprises a sequence of lines of signal, for example, 480 lines of signal for a SuperVGA signal. Each of the lines is represented by a number of pixels such as 640 pixels. In other words, the non-interlaced video signal can be viewed as a representation of an array of pixels, each pixel is a light energy intensity or intensity level. A graphics or an image is therefore represented by varying the pixel intensities, for example, a cluster of pixels being zero values is a representation of a black patch or a sequence of pixels being 255 is a representation of a white trace or line provided the representation is in 8-bit range. The non-interlaced signal 18 is to be converted through the disclosed system to generate two fields of signals, one field 20 comprising all odd lines of signals and the other field 22 comprising all even lines of signals. The composite of the two fields 20 and 22 becomes the interlaced video signal, a standard input to most of the television. Some of advanced televisions are able to receive digital signals, therefore the composite of the two fields 20 and 22 can be directly input to the televisions. Nevertheless a D/A converting processing must be provided when televisions can only receive analog signals. It is understood to those is skilled in the art that such D/A converting processing has been readily available in many commercially available products and therefore the output of the disclosed system in the following description remains digital.

To fully understand the disclosed system, it is necessary to understand the operation and structure of a first-in-first-out (FIFO) video line buffer used therein. Referring now to FIG. 3, there is illustrated a representation of the FIFO line buffer. The line buffer comprises a number of cells, preferably the same number of the pixels in one video line. Each of the cells stores one pixel value. If it is assumed that there are N number of pixels in one line of video signal, hence there are N cells in the line buffer as numbered 0, 1, 2, . . . , N−3, N−2 and N−1. When a line of pixel signal, for example $p_0, p_1, p_2, \ldots, p_{N-2}$ and $p_{N-1}$, is received at the input of the line buffer, the very first pixel value $p_0$ enters in the first cell indicated by 24. The subscript of the pixels $p_0$, $p_1, p_2, \ldots, p_{N-2}$ or $P_{N-1}$ indicates the pixel position in each line and also means the vertical or column position in the array of a pixel image, therefore 0, 1, 2, . . . , N−2 or N−1 thereof are sometimes referred to as vertical or column positions herein. Synchronized with a clocking signal that is not shown in the figure, the FIFO line buffer shifts one pixel in one cell to adjacent cell. When all the pixels $p_0, p_1, p_2, \ldots, p_{N-2}$ and $P_{N-1}$ enter in the line buffer, the first pixel po has reached the last cell 26 of the line buffer. The time it takes to fill in the line buffer with the line signal $p_0, p_1, p_2, \ldots, p_{N-2}$ and $P_{N-1}$ is exactly the time it takes for the video card or the computer to start to output a second line, numerically about 15 to 30 microsecond depending on what format is concerned. In other words, when the first pixel $p_0$ is shifted out from the line buffer, the very first pixel of the second line is just sent out from the computer and shifted into the first cell 24. The precise timing makes it possible for subsequent processors to perform calculations between two adjacent lines. The implementation of the line buffer is known to those skilled in the art and many forms of computer memories, such as random access memory (RAM), can be used as the video line buffer and are commercially available. The time is preferably guaranteed by the clocking source that generally synchronizes all components in the disclosed system or a clocking source in a computer if the disclosed system is built into the computer. Such clocking source is well known in the art.

According to one preferred embodiment of the present invention, FIG. 4 shows the architecture for reducing flicks in video signal conversions. Referenced by 52 is an input that can be the non-interlaced video signals from a non-interlaced video source such as the one described in FIG. 1. The video signals comprising a number of line signals, as illustrated in FIG. 2, come in sequentially line by line and each of the video line signals comprises a fixed number of pixels, e.g. 512 or 640 pixels in a line. When a line of signal comes, it goes along two paths 54 and 56 respectively. In the path of 54, a line signal, or every pixel in the line, is multiplied by an adjustable parameter $a_1$ at a multiplier 58 and goes to the output adder 60. In the path 56, the line signal is multiplied by another adjustable parameter $a_0$ at a multiplier 62 and goes to an adder 64. The adder 64 adds the output of the multiplier 62 to an output from a FIFO line buffer 66 and sends the result to a multiplexer 68. As illustrated, the multiplexer 68 receives a second input from the output of the multiplier 58. With the two inputs, one from the adder 64 and the other from the multiplier 58, the multiplexer 68, controlled by an even/odd line select control signal 70 selects one input therefrom according to the even/odd control signal 70. The even/odd line select control signal 70 is to control the passage of either an even line signal or an odd line signal, namely either a signal 74 from the adder 64 or a signal 76 from the multiplier 58. It is understood to those skilled in the art that the even/odd line select control signal 70 can be generated from a commercially available pulse counter or directly from the input signal 52. The FIFO line buffer, as described in FIG. 3, comprises preferably the same number of memory cells as the number of pixels of a line signal from the input 52 such that each cell houses one pixel. As the line signal comes sequentially, a newly arrived pixel enters the FIFO line buffer 66, there must be a previously stored pixel moving out from the FIFO line buffer 66. The output 72 of the architecture 50 is from the adder 60 that combines the output from the multiplier 58 and the output from the FIFO liner buffer.

The process involved in the architecture can be summarized with the following operational relationship:

Odd (even) lines:

$$\text{buffer input} = \text{buffer output} + a_0 \times \text{input}; \qquad \text{Op.1}$$

Even (odd) lines:

$$\text{output} = \text{buffer output} + a_1 \times \text{input}; \qquad \text{Op.2}$$

$$\text{buffer input} = a_0 \times \text{input}; \qquad \text{Op.3}$$

where the pair of parenthesis correspond to one selection, that means either the odd lines or the even lines are disregarded such that the corresponding even lines or odd lines are for the output. Operation 1 or Op. 1 shows that an input to the FIFO line buffer is generated by selecting the signal 74 from the adder 64, combining an output shifted out from the FIFO line buffer with the output from the multiplier 62 while the output 72 is disregarded, which means the even numbered lines are not to be used. For an immediate following even line signal, output 72 is formulated according to Op. 2 meanwhile the buffer input is generated by selecting the output 76 from the multiplier 58 as shown by Op. 3.

To be even more specific, the process involving Op. 1, Op. 2 and Op. 3 is further illustrated with an example according to one preferred embodiment:

| Input (52) | buffer input | output (72) |
|---|---|---|
| 0th line | — | — |
| 1st line | $a_1 \times 1^{st}$ | $a_1 \times 0^{th} + a_1 \times 1^{st}$ |
| 2nd line | $a_1 \times 2^{nd}$ | $a_0 \times 1^{st} + a_1 \times 2^{nd}$ |
| 3rd line | $a_1 \times 2^{nd} + a_0 \times 3^{rd}$ | $a_0 \times 2^{nd} + a_1 \times 3^{rd}$ |
| 4th line | $a_1 \times 4^{th}$ | $a_1 \times 2^{nd} + a_0 \times 3^{rd} + a_1 \times 4^{th}$ |
| 5th line | $a_1 \times 4^{th} + a_0 \times 5^{th}$ | $a_1 \times 4^{th} + a_1 \times 5^{th}$ |
| 6th line | $a_1 \times 6^{th}$ | $a_1 \times 4^{th} + a_0 \times 5^{th} + a_1 \times 6^{th}$ |
| 7th line | $a_1 \times 6^{th} + a_0 \times 7^{th}$ | $a_1 \times 6^{th} + a_1 \times 7^{th}$ |
| 8th line | $a_1 \times 8^{th}$ | $a_1 \times 6^{th} + a_0 \times 7^{th} + a_1 \times 8^{th}$ |

The above outputs 72, each results from a corresponding input 52. Evidently, as soon as the output 72 is stabilized, starting from the $4^{th}$ line, a conclusion can be derived from the above example that at any odd line k, the buffer input is in the following expression:

$$a_1 \times (k-1)^{th} + a_0 \times k^{th}$$

and at any immediate even numbered line following an odd numbered line, the buffer input and the output are, respectively, in the following expressions:

$$a_1 \times (k+1)^{th}$$

$$a_1 \times (k-1)^{th} + a_0 \times k^{th} + a_1 \times (k+1)^{th}$$

where $(k-n)^{th}$ and $(k+n)^{th}$ mean n lines before and after the $k^{th}$ line, respectively, wherein n is an integer number. It can be readily understood that at any immediate odd numbered line following an even numbered line, the buffer input and the output are, respectively, in the following expressions:

$$a_1 \times (k-1)^{th} + a_0 \times k^{th}$$

$$a_1 \times (k-1)^{th} + a_1 \times k^{th}$$

If the adjustable parameter $a_0$ and $a_1$ are set to 0.5 and 0.25 respectively, the output can be expressed as:

$$0.25 \times (k-1)^{th} + 0.5 \times k^{th} + 0.25 \times (k+1)^{th} \text{ Even(Odd)}$$

$$0.25 \times (k-1)^{th} + 0.25 \times k^{th} \text{ Odd(Even)}$$

It can be appreciated that the output is in fact a weighted average of two or three adjacent lines of signals.

Now referring to FIG. 5, there is shown a process flow diagram of the disclosed system 100 for reducing flickers in converting non-interlaced video signals to interlaced video signals according to one preferred embodiment of the present invention. As explained above, the non-interlaced video input 80 is not limited to video interface card in a computing device. It can be appreciated that the system 100 works with any non-interlaced video source. At 82 and 84, two adjustable parameters are independently generated and the values thereof may not be necessarily the same, for example, each being a fractional number, one being 0.5 and the other being 0.25. That means any signals to be adjusted by the two parameters will result in a magnitude change. The two parameters are used to adjust the video input 80 at 86 and 88 respectively. As illustrated in FIG. 4, the adjusting means can be a multiplication, namely the video input 80 is multiplied by the two adjustable parameters, respectively, resulting in two adjusted video inputs 90 and 92. At 94, the adjusted input 90 is combined with a signal from a signal delaying process 96 and the combined signal is sent to a multiplexer 97 as one of the two inputs. It should be noted that the delaying process can be achieved using a line buffer as shown in FIG. 4, namely a $k^{th}$ pixel of one line just shifting out of the line buffer when a $k^{th}$ pixel of the following line arrives at 94. It may become apparent now that the signal delaying process 96 may be achieved by means other than the line buffer illustrated in FIG. 3. The second input 92 of the multiplexer 97 is the output from 88. The multiplexer 97, controlled by an even/odd line signal, allows one of the two inputs, either 90 or 92, to pass therethrough to the delay process 96. Further the output of the multiplexer 97 and the output 92 are combined at 98 to generate an interlaced video signal 99 with reduced flickers because of the embedded weighted averaging process.

The present invention has been described in sufficient detail with one exemplary embodiment. Alternative embodiments will become apparent to those skilled in the art to which the present invention pertains without departing from its spirit and scope. Further changes and new arrangement of the operational relationships described above may be made by those skilled in the art without departing from the principle and scope of the invention. Accordingly, the scope of the present invention is defined by the appended claims rather than the forgoing description of particular embodiments.

What is claimed is:

1. A method for reducing flickers in transforming non-interlaced video signals to interlaced video signals, each of the video signals comprising a plurality of lines of signals, each of the line signal comprising pixels, the method comprising the steps of:

receiving the non-interlaced video signals;

outputting the pixels in the non-interlaced video signals successively and line by line;

receiving a first adjustable parameter and a second adjustable parameter;

obtaining a first modified signal resulting from the non-interlaced video signals being modified by the first adjustable parameter;

obtaining a second modified signal resulting from the non-interlaced video signals being modified by the second adjustable parameter;

receiving a multiplexed signal from a multiplexer having a first input and a second input, wherein the first input and the second input receive a combined signal and the second modified signal, respectively and wherein the multiplexed signal is selected alternatively from the first input and the second input;

delaying the multiplexed signal;

generating the combined signal by combining the delayed multiplexed signal with the first modified signal;

output the combined signal as the interlaced video signals.

2. The method as recited in claim 1 wherein the first adjustable parameter is a first fractional constant.

3. The method as recited in claim 2 wherein the second adjustable parameter is a second fractional constant.

4. The method as recited in claim 3 wherein the step of obtaining a first modified signal resulting from the non-interlaced video signals being modified by the first adjustable parameter comprises the step of multiplying each of the pixels in the non-interlaced video signals by the first adjustable parameter.

5. The method as recited in claim 4 wherein the step of obtaining a second modified signal resulting from the non-interlaced video signals being modified by the second adjustable parameter comprises the step of multiplying each of the pixels in the non-interlaced video signals by the second adjustable parameter.

6. The method as recited in claim 5 wherein the step of delaying the multiplexed signal comprises the step of shifting the multiplexed signal sequentially and one-pixel by one-pixel through a first-in-first-out video buffer.

7. An architecture for reducing flickers in transforming non-interlaced video signals to interlaced video signals, each of the video signals comprising a plurality of lines of signals, each of the line signal comprising pixels, the architecture comprising:

a first multiplier, receiving the non-interlaced video signals, for multiplying the received non-interlaced video signals with a first adjustable parameter;

a second multiplier, receiving the non-interlaced video signals, for multiplying the received non-interlaced video signals with a second adjustable parameter;

means for delaying a multiplexed signal;

a first adder in connection, respectively, with the first multiplier and the delaying means, for combining a first multiplied result from the first multiplier with the delayed multiplexed signal from the delaying means;

a multiplexer having a first input and a second input, the first input receiving an added result from the first adder and the second input receiving a second multiplied result from the second multiplier; and a second adder, in connection, respectively, with the delaying means and second multiplier, for combining the delayed multiplexed signal from the delaying means with the second multiplied result from the second multiplier.

8. The architecture as recited in claim 7 wherein the delaying means comprises: means for shifting the multiplexed signal out sequentially, resulting a time delay.

9. The architecture as recited in claim 8 wherein the delaying means is a first-in-first-out line buffer.

10. The architecture as recited in claim 9 wherein the multiplexer is controlled by an odd/even selection signal such that the multiplexer outputs alternatively the first input and the second input.

11. The architecture as recited in claim 10, wherein the first adjustable parameter is a first fractional constant.

12. The architecture as recited in claim 11, wherein the second adjustable parameter is a second fractional constant.

13. The architecture as recited in claim 12, wherein first multiplier produces a first magnitude-reduced version of the non-interlaced video signals.

14. The architecture as recited in claim 13 wherein the second multiplier produces a second magnitude-reduced version of the non-interlaced video signals.

* * * * *